(12) United States Patent
Ooshima et al.

(10) Patent No.: US 6,458,332 B2
(45) Date of Patent: Oct. 1, 2002

(54) CRYSTALLIZATION APPARATUS AND CRYSTALLIZATION METHOD

(75) Inventors: Hiroshi Ooshima, Ikoma; Hideo Noda, Amagasaki, both of (JP)

(73) Assignee: Kansai Chemical Engineering Co., Ltd., Hyogo (JP)

( * ) Notice: Subject to any disclaimer, the term of this patent is extended or adjusted under 35 U.S.C. 154(b) by 0 days.

(21) Appl. No.: 09/801,747

(22) Filed: Mar. 9, 2001

(51) Int. Cl.[7] .................................................. B01D 9/00
(52) U.S. Cl. ..................... 422/254; 422/245.1; 422/258; 422/259
(58) Field of Search ............................... 422/245.1, 254, 422/257, 258, 259, 260

(56) References Cited

U.S. PATENT DOCUMENTS 2,651,566 A * 9/1953 Warner et al. ............... 117/206
6,315,966 B1 * 11/2001 Baumgard et al. ........ 422/245.1

FOREIGN PATENT DOCUMENTS

| EP | 0 861 685 A2 | 2/1998 |
| JP | 47-2712 | 2/1972 |
| JP | 56-152702 | 11/1981 |
| JP | 58-104603 | 6/1983 |

* cited by examiner

Primary Examiner—Felisa Hiteshew
(74) Attorney, Agent, or Firm—Jagtiani + Guttag

(57) ABSTRACT

The invention provides a crystallization apparatus that includes an agitation tank, a liquid circulation means for circulating a liquid or a slurry along a wall of the agitation tank, and one or more temperature difference creation means capable of creating a temperature difference at the wall of the agitation tank, wherein the temperature difference creation means is installed to the agitation tank. The temperature difference creation means is, for example, arranged at a region where liquid or slurry spouted by rotating the liquid spouting device contacts the wall of the agitation tank or a region below that region, and which increases or decreases the temperature of the spouted liquid or slurry compared to the temperature of surrounding liquid or slurry. Since the apparatus with this configuration has a large vaporization area and a large heat transfer area, the induction period for crystal generation can be shortened, and crystals with narrow size distribution and large size can be obtained. Furthermore, it is possible to obtain a specified crystal form, that is, it is possible to control crystal polymorphism.

22 Claims, 11 Drawing Sheets

(A) P.8h (B) P.W.W.8h (C) P.12h (D) P.W.W.12h (E) P.16h (F) P.W.W.16h (A)

(B)

CRYSTALLIZATION APPARATUS AND CRYSTALLIZATION METHOD

TECHNICAL FIELD

The present invention relates to a crystallization apparatus and a crystallization method. More specifically, the present invention relates to a crystallization apparatus which enables an induction time for crystallization to be shorter, and can provide large crystals with a narrow size distribution, as well as to a method for obtaining such crystals. Furthermore, the present invention relates to a method for controlling crystal polymorphism.

BACKGROUND ART

One known method for crystallization is to raise the concentration of the solution by evaporating the solvent. In this method, when the concentration of the material to be crystallized in the solution increases, the evaporation rate of the solvent decreases, so that there is a disadvantage that the crystallization gradually slows down, and the distribution of the diameters of the obtained crystals becomes broad. Furthermore, there is a problem with regard to costs, because the solvent has to be evaporated over a long period of time.

On the other hand, there is also a crystallization method, that is cooling crystallization. However, there are many problems such as: the crystallization requires a lot of time; separation is difficult; and an adjustment of the particle size is difficult. Moreover, there is a problem that the cooling is expensive.

Furthermore, a substance can take various crystal forms, such as α-crystals, β-crystals, and γ-crystals, and the solubility of the substance varies depending on the crystal form. Especially in the field of medicine, it is important to make a crystal form uniform, since uniform solubility of the pharmaceuticals can be obtained by a specified crystal form. However, it is difficult to attain a specified crystal form (that is, to control crystal polymorphism), and it is also difficult to separate crystals with a specified crystal form from a mixture of crystals with various crystal forms.

Consequently, there is a demand for a fast and simple method for obtaining crystals with uniform crystal form (that is, possible to control crystal polymorphism), narrow size distribution and large diameters.

DISCLOSURE OF THE INVENTION

A crystallization apparatus in accordance with the present invention includes an agitation tank, a liquid circulation means for circulating a liquid or a slurry along a wall of the agitation tank, and one or more temperature difference creation means capable of creating a temperature difference at the wall of the agitation tank, wherein the temperature difference creation means is installed to the agitation tank.

Another crystallization apparatus in accordance with the present invention includes an agitation tank provided with a liquid spouting device made of a rotation shaft and one or more liquid feeding means mounted to the rotation shaft, and one or more temperature difference creation means capable of creating a temperature difference at a wall of the agitation tank.

In a preferable embodiment, the temperature difference creation means is one or more heating means or cooling means.

In a preferable embodiment, the temperature difference creation means is a heating means, which is provided at a region where liquid or slurry spouted by rotating the liquid spouting device contacts the wall of the agitation tank or a region below that region, and which increases the temperature of the spouted liquid or slurry above the temperature of surrounding liquid or slurry.

In another preferable embodiment, the temperature difference creation means is a cooling means, which is provided at a region where liquid or slurry spouted by rotating the liquid spouting device contacts the wall of the agitation tank or a region below that region, and which decreases the temperature of the spouted liquid or slurry above the temperature of surrounding liquid or slurry.

In a preferable embodiment, the temperature difference creation means includes two cooling means and one heating means, the heating means is arranged below the two cooling means, and a liquid or slurry is spouted against a portion between the two cooling means or against a portion of the lower cooling means by rotating the liquid spouting device.

In another preferable embodiment, the liquid feeding means is a gutter-shaped body, a pipe body, a plate-shaped body, or a conically shaped hollow truncated corn body.

In a preferable embodiment, the crystallization apparatus is a cooling crystallization apparatus.

In another preferable embodiment, the crystallization apparatus is a concentration crystallization apparatus.

A method for controlling crystal polymorphism in accordance with the present invention comprises concentrating a liquid for generating crystals while circulating the liquid along a tank wall provided with a temperature difference.

Another method for controlling crystal polymorphism comprises spouting a liquid or a slurry from a liquid spouting device containing a rotation shaft and one or more liquid feeding means mounted to the rotation shaft, and contacting the spouted liquid or slurry with a tank wall whose temperature is different from the temperature of the liquid or slurry and circulating the liquid or slurry.

In a preferable embodiment, the spouted liquid or slurry is contacted with a tank wall whose temperature is higher than the temperature of the liquid or slurry.

In another preferable embodiment, the spouted liquid or slurry is contacted with a tank wall whose temperature is lower than the temperature of the liquid or slurry.

A method for growing crystals with large average diameter in accordance with the present invention comprises spouting a liquid or a slurry from a liquid spouting device containing a rotation shaft and one or more liquid feeding means mounted to the rotation shaft, and contacting the spouted liquid or slurry with a tank wall whose temperature is different from the temperature of the liquid or slurry and circulating the liquid or slurry.

BRIEF DESCRIPTION OF THE DRAWINGS

FIG. 11A shows crystals obtained with the apparatus of the present invention, and FIG. 11B shows crystals obtained with a conventional apparatus. The magnification of FIGS. 11A and B is 100-fold.

BEST MODE FOR CARRYING OUT THE INVENTION

Definitions

Throughout this specification, "liquid" refers to a liquid not containing crystals, and "slurry" refers to a liquid containing crystals. Moreover, "liquid circulation means" and "liquid spouting device" refer to a means for circulating and a device for spouting a liquid or a slurry, respectively.

Crystallization Apparatus in Accordance with the Invention

A crystallization apparatus in accordance with the present invention includes an agitation tank, a liquid circulation means for circulating a liquid or a slurry along a tank wall of the agitation tank, and one or more temperature difference creation means capable of creating a temperature difference at the wall of the agitation tank, wherein the temperature difference creation means is installed to the agitation tank.

The most preferable embodiment of such a crystallization apparatus includes an agitation tank provided with a liquid spouting device including a rotation shaft and one or more liquid feeding means mounted to the rotation shaft, and one or more temperature difference creation means capable of creating a temperature difference at the wall of the agitation tank.

The crystallization apparatus of the present invention is characterized in that it has a liquid circulation means, such as a liquid spouting device, and that it can bring the liquid or slurry in contact with different temperatures (that is, a higher or lower temperature). Consequently, the crystallization apparatus of the present invention can use three variables: amount of circulation liquid, high temperature and low temperature. By using a crystallization apparatus of the present invention with these features, it is not only possible to control crystal polymorphism, but also possible to grow (produce a crystal) rapidly and easily a crystal with narrow size distribution and large average diameter.

As the liquid circulation means used in the present invention, a means, which circulates the liquid or the slurry along the tank shape of the agitation tank, is preferable. For example, such a means includes a means for lifting the liquid or slurry to an upper portion of the agitation tank by using a circulation pump and letting the liquid or slurry flow along the tank wall from the upper portion, a means for letting the liquid or slurry flow along the tank wall from the upper portion of the agitation tank with a spray nozzle or the like, and a means for spouting liquid or slurry against the tank wall. Among these, it is most preferable to use a liquid spouting device that utilizes Bernoulli's theorem and/or centrifugal forces to pump the liquid or slurry up and spout it against the tank wall.

The following is a description of a crystallization apparatus of the present invention using a liquid spouting device. Needless to say, the crystallization apparatus of the present invention is not limited to examples using a liquid spouting device.

Figure 1:
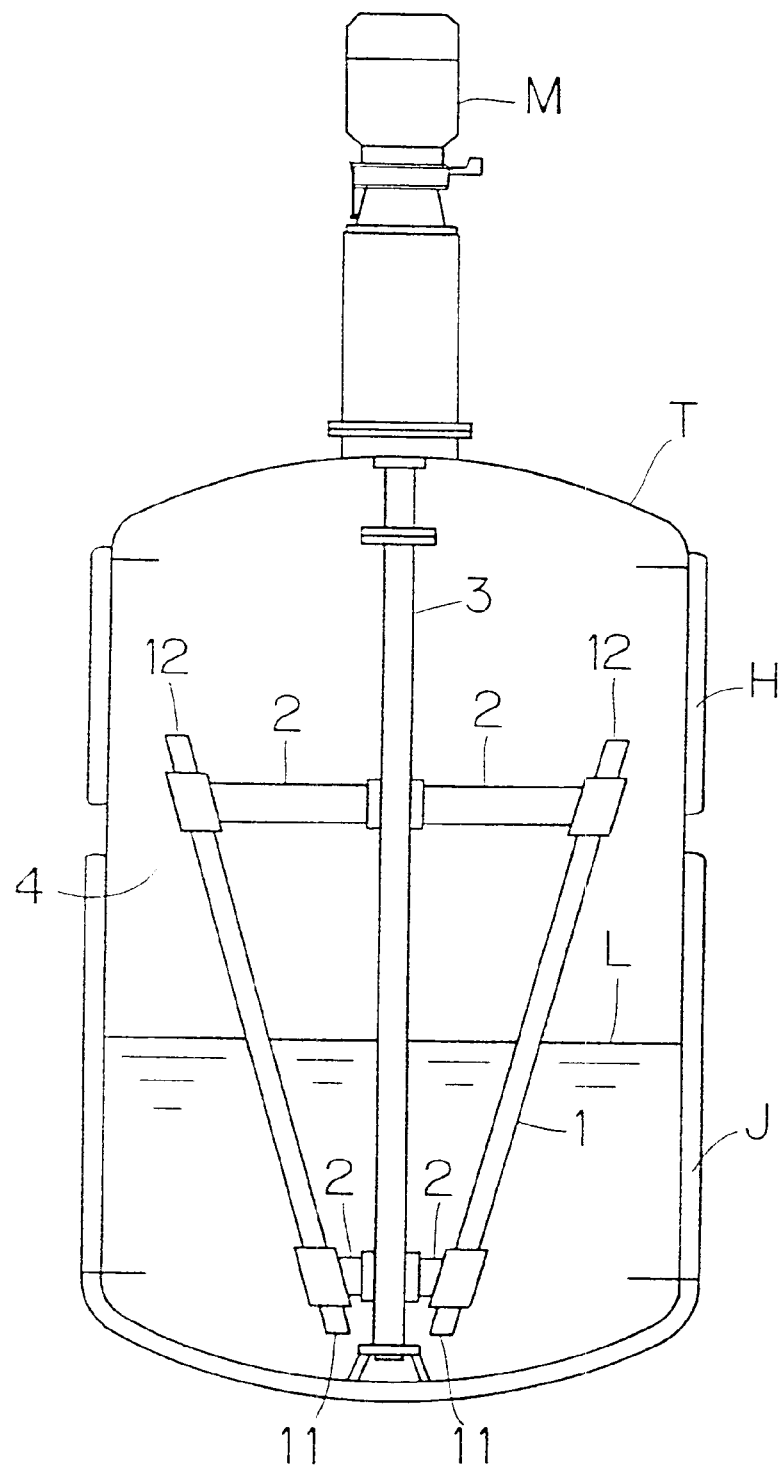
FIG. 1 shows an example of a crystallization apparatus in accordance with the present invention.

FIG. 1 shows a crystallization apparatus of the present invention. A motor M to which a rotation shaft 3 is attached is mounted to an agitation tank T. The liquid spouting device 4 is constituted by liquid feeding means 1 made of hollow pipes and attachment devices 2, and is mounted to the rotation shaft 3. H and J are temperature difference creation means. The temperature difference creation means H and J are set to produce a temperature difference. That is to say, the temperature of the temperature difference creation means H arranged at the upper portion of the agitation tank T may be set to a higher or to a lower temperature than the temperature of the temperature difference creation means J arranged at the lower portion of the agitation tank T.

Lower openings 11 of the liquid feeding means 1 are arranged underneath the liquid surface L, whereas upper openings 12 of the liquid feeding means 1 are arranged above the liquid surface L. The liquid feeding means 1 are mounted at a certain inclination angle to the attachment devices 2. When the liquid spouting device 4 rotates together with the rotation of the rotation shaft 3, it takes up liquid or slurry from the lower openings 11 of the liquid feeding means 1, moves the liquid or slurry through the liquid feeding means 1, and spouts the liquid or slurry from the upper opening 12, so that the spouted liquid is brought into contact with the temperature difference creation means H arranged at the upper portion of the agitation tank T.

Depending on the temperature difference creation means H, the temperature of the spouted liquid or slurry becomes higher or lower than the surrounding temperature.

If the temperature difference creation means H is a heating means, then fine crystals dissolve as the slurry passes through the heated region, and since the slurry flows back along the inner wall into the cooling tank, the heat transfer area of the lower portion can always be used completely, so that the cooling rate can be raised, the induction period for crystal generation is shortened, and crystals with narrow size distribution and large size are grown. Such a crystallization apparatus is an example for a cooling crystallization apparatus.

On the other hand, if the temperature difference creation means H is a cooling means, then the crystallization in the slurry is accelerated as the slurry passes through the cooled region, and since the slurry flows back along the inner wall, the crystallization rate can be raised, the induction period for crystal generation is shortened, and crystals with narrow size distribution and large size are grown. Such a crystallization apparatus is an example of a concentration crystallization apparatus.

Figure 2:
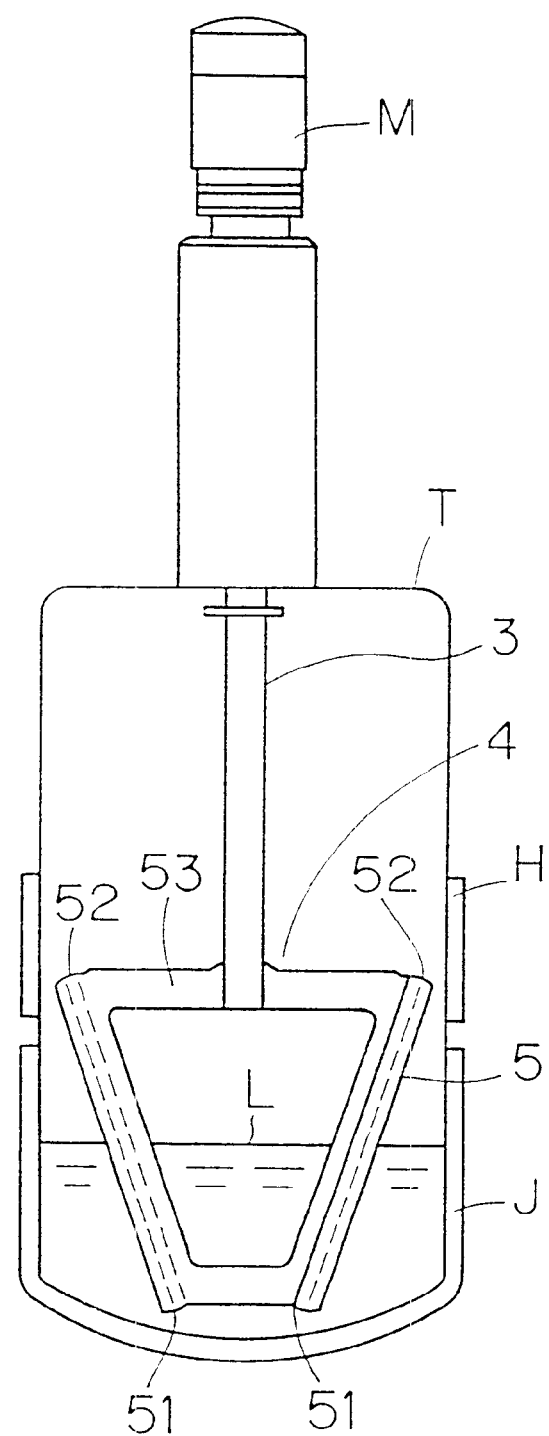
FIG. 2 shows an example of a liquid spouting device installed with a gutter-shaped body as a liquid feeding means.

The crystallization apparatus in FIG. 2 is also a crystallization apparatus as the one in FIG. 1. This crystallization apparatus is an example of a crystallization apparatus having a gutter-shaped body 5 as the liquid spouting device 4. By rotating the shaft 3 where the gutter-shaped bodies 5 attached to the rotation shaft 3 pass forward and a flat plate portions 53 follow (in the direction indicated by the arrow in the drawings), the liquid or slurry is raised from lower openings 51 of the gutter-shaped bodies 5, spouted from upper openings 52 and brought into contact with the heated or cooled region of the temperature difference creation means H.

Figure 3:
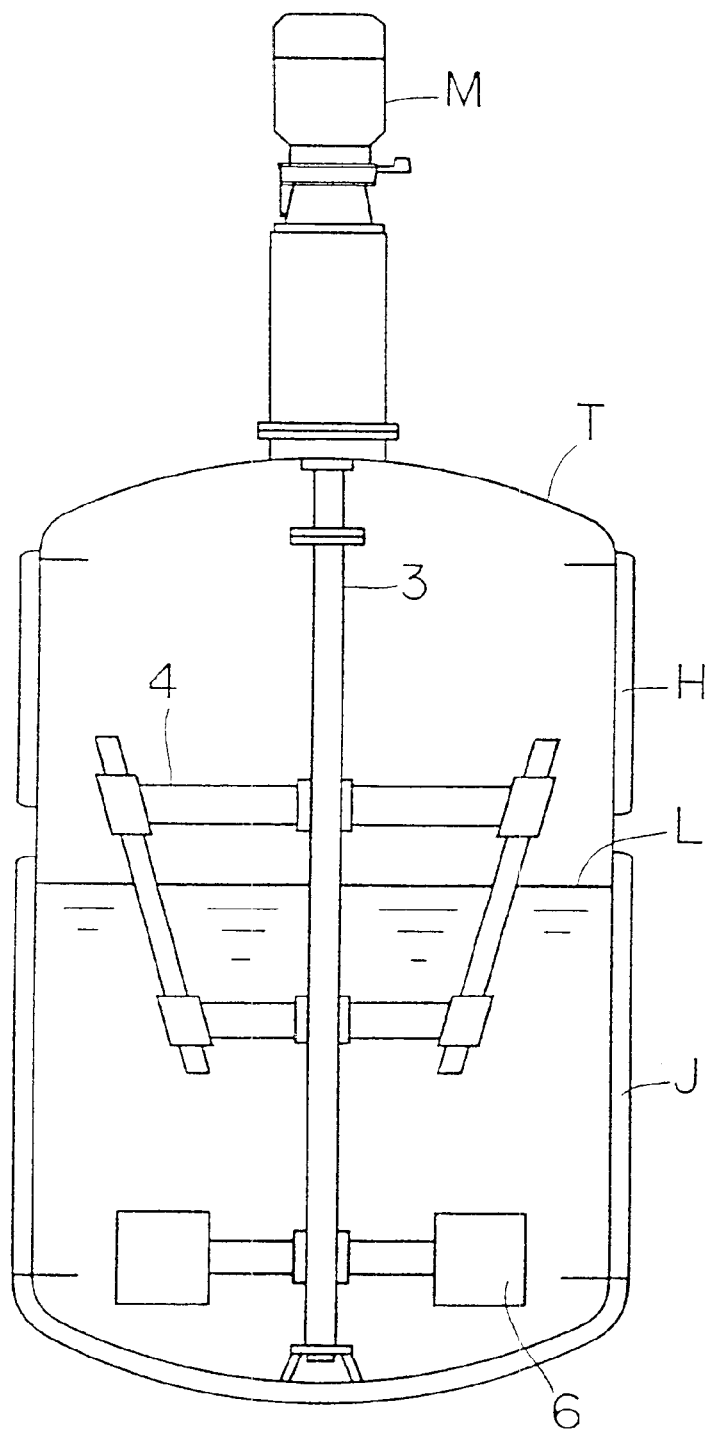
FIG. 3 shows another embodiment of a crystallization apparatus in accordance with the present invention.

The crystallization apparatus in FIG. 3 is an example of a crystallization apparatus, in which the liquid spouting device 4 is attached to an upper portion of the rotation shaft 3, and agitation blades 6 are provided below the liquid spouting device 4. When the liquid or slurry in this device is concentrated to a certain degree, the liquid is not spouted anymore, so that thereafter, the crystallization is performed by agitating.

In this manner, the apparatus of the present invention can be used for both cooling crystallization and concentration crystallization. Since the apparatus of the present invention has a large evaporation area and a large heat transfer area, the induction period for crystallization is shortened, and large crystals with a narrow size distribution are obtained. Furthermore, it is possible to obtain a specified crystal form, that is, it is possible to control crystal polymorphism.

The following is an explanation of the various elements of a crystallization apparatus in accordance with the present invention.

A. Liquid Spouting Device

The liquid spouting device is explained by the example of the apparatus shown in FIG. 1. The liquid spouting device 4 is constituted by liquid feeding means 1 of hollow pipes and attachment devices 2, and is mounted to the rotation shaft 3. Lower openings 11 of the liquid feeding means 1 are arranged underneath the liquid surface L, and upper openings 12 of the liquid feeding means 1 are above the liquid surface L. The liquid feeding means 1 are mounted at a certain inclination angle to the attachment devices 2. When the liquid spouting device 4 rotates together with the rotation of the rotation shaft 3, it takes up liquid or slurry from the lower openings 11 of the liquid feeding means 1 (for example, pipes), moves the liquid or slurry through the liquid feeding means 1, and spouts the liquid or slurry from the upper openings 12, so that the spouted liquid is brought into contact with the tank wall of the agitation tank T.

The position where the spouted liquid hits the tank wall of the agitation tank is changed by changing the mounting angle of the liquid feeding means 1 of the liquid spouting device 4, by changing the number of rotation, or the like. Consequently, the angle at which the liquid feeding means 1 is attached to the liquid spouting device 4 and the number of rotation may be changed under consideration of the position of the temperature difference creation means discussed below.

It should be noted that the liquid spouting device 4 shown in FIG. 1 is merely an example. For example, the device described in Japanese Laid-Open Patent Publication No. 6-335627 is used as the liquid spouting device 4 used in the crystallization apparatus of the present invention.

There is no limitation with regard to the shape of the liquid feeding means 1 attached to the liquid spouting device, as long as it is a shape with which liquid or slurry can be moved by rotation of the rotation shaft 3, in accordance with Bernoulli's theorem and/or centrifugal forces. In addition to the pipes shown in FIG. 2, for example, a gutter-shaped body, a plate-shaped body, a conically shaped hollow truncated corn body can be included.

B. Temperature Difference Creation Means

The temperature difference creation means used in the apparatus of the present invention are set to produce a temperature difference. That is to say, the temperature of the temperature difference creation means arranged at the upper portion of the agitation tank may be set to a higher or to a lower temperature than the temperature of the temperature difference creation means arranged at the lower portion of the agitation tank. Which temperature is set to be higher may be decided depending on the desired crystal form (for example, α-crystal, β-crystal). Crystal polymorphism can be controlled by providing a temperature difference between the upper portion and the lower portion of the agitation tank.

The temperature difference creation means is provided at a region where the liquid spouted from the liquid spouting device contacts the tank wall of the agitation tank or at a region below this. Examples of the temperature difference creation means include electrical heaters, electromagnetically induced heatings, heating coils, heating plates, or jackets in which a heating gas, vapor, heating medium, warm water, cooling water, brine and the like, can be circulated. The temperature difference creation means may be provided on the outer side of the agitation tank, or on the inner side thereof. Furthermore, the temperature difference creation means may be provided in a shiftable manner. Consequently, for example, heating coils, heating plates, cooling plates, and the like may be provided on the inner side of the tank wall of the agitation tank so as to hit the liquid spouted from the liquid spouting device against the heating coils, heating plates, cooling plates, and the like.

In some cases it is preferable that the temperature difference creation means is shiftable, because the position where the spouted liquid hits the tank wall is varied by changing the number of rotation of the liquid spouting device periodically or at random. Furthermore, in the temperature difference creation means, heating devices may be fixed so as to heat only desired regions, for example by computer control and the like.

The liquid or slurry is not spouted when the number of rotation of the liquid spouting device is reduced. However, if two temperature difference creation means are provided and the temperature of the lower one is low, this portion functions as a condenser, which makes it easier to control crystal polymorphism.

It is also preferable to provide three or more temperature difference creation means. It is preferable for a concentration crystallization apparatus (which will be explained below) to provide, for example, three temperature difference creation means, and to cool the upper and intermediate two and heat the lower one. When the liquid spouted from the liquid spouting device does not contact the uppermost cooling portion but contacts the intermediate portion, there is the possibility that crystals are generated at this intermediate portion. However, since the upper portion can function as a condenser, the liquid condenses and there is a high possibility that the intermediate-cooling portion can be rinsed with a liquid of low concentration. When the number of rotation of the liquid spouting device is reduced, the liquid or slurry is not spouted, so that the crystals that have been generated at the intermediate cooling portion can be rinsed away with the liquid that has condensed at the upper cooling portion. Consequently, it is also preferable to provide three or more temperature difference creation means.

C. Crystallization Method

C-1 Cooling Crystallization apparatus and Crystallization Method

A cooling crystallization apparatus is explained with reference to FIG. 1. In the cooling crystallization apparatus of FIG. 1, the temperature of the temperature difference creation means H (at an upper portion of the tank wall) is higher than the temperature of the temperature difference creation means J (at a lower portion of the tank wall). Therefore, it is preferable that the temperature difference creation means H is a heating means (for example, a heater or heating coil), and that the temperature difference creation means J (at a lower portion of the tank wall) is a cooling means (for example, a cooling jacket).

By rotating the liquid spouting device 4, the slurry containing fine crystals generated by cooling is spouted against the upper portion of the agitation tank T, and as the slurry passes through the region that has been heated by the temperature difference creation means H (heating means), the fine crystals in the slurry are dissolved, and since the slurry flows back along the inner wall into the cooling tank, all the heat transfer area of the lower portion can always be used, so that the advantages obtained are that the cooling rate can be raised, the induction period for crystallization is shortened, and crystals with narrow size distribution and large size are grown.

Since the crystallization apparatus of the present invention can also be used as a concentration apparatus, if concentration of the liquid is necessary before making transition to cooling crystallization, it is possible to use the temperature difference creation means J (at a lower portion of the tank wall) as a heating means, to make the evaporation area and the heat transfer area large, to carry out the concentration fast, and to considerably shorten the time needed for the crystallization as a whole. That is to say, it is possible to set the temperature of the temperature difference creation means H (at an upper portion of the tank wall) low and the temperature of the temperature difference creation means J (at a lower portion of the tank wall) high to perform concentration to a certain degree, and then set the temperature of the temperature difference creation means H (at an upper portion of the tank wall) high and the temperature of the temperature difference creation means J (at a lower portion of the tank wall) low to carry out the cooling crystallization.

C-2 Concentration Crystallization apparatus and Crystallization Method

A concentration crystallization apparatus is explained with reference to FIG. 1. In the concentration crystallization apparatus of FIG. 1, the temperature of the temperature difference creation means H (at an upper portion of the tank wall) is lower than the temperature of the temperature difference creation means J (at a lower portion of the tank wall). Therefore, it is preferable that the temperature difference creation means H is a cooling means (for example, a cooling jacket), and that the temperature difference creation means J (at a lower portion of the tank wall) is a heating means (for example, a heater or heating coil).

By rotating the liquid spouting device 4, the slurry containing fine crystals generated by cooling is spouted against the upper portion of the agitation tank T, and as the slurry passes through the region that has been cooled by the temperature difference creation means H (cooling means), the crystallization in the slurry is accelerated, and since the slurry flows back along the inner wall, so that advantages obtained are that the crystallization rate can be raised, the induction period for crystal generation can be shortened, and large crystals with a narrow size distribution can be grown. For example, crystallizing glutamic acid by using this apparatus, it makes possible to selectively grow the metastable crystals, α-crystals.

Furthermore, in the concentration crystallization apparatus of the present invention, the heated liquid can be spouted against the upper portion of the tank with the liquid spouting device, so that a large evaporation area can be obtained, which makes the evaporation of the liquid effective and makes it possible to obtain large crystals.

Moreover, examples of methods for preventing crystals from adhering to the lower portion of the crystallization apparatus include to control the vacuum degree by temperature, if a solution evaporating in a vacuum is used, or to lower the temperature by the heat of vaporization. It is also possible to prevent crystals from adhering to the lower portion of the crystallization apparatus by circulating a cooled gas.

As described above, a crystallization apparatus in accordance with the present invention includes an agitation tank having a liquid circulation means for circulating a liquid or a slurry along the tank wall of the agitation tank, preferably a liquid spouting device made of a rotation shaft and one or more liquid feeding means mounted to the rotation shaft. Thus, by rotating the rotation shaft, the liquid or slurry is moved from the lower openings by centrifugal forces or the like through the liquid feeding means and the liquid or slurry is spouted from the upper opening against the upper portion of the tank.

The spouted liquid or slurry contacts the temperature difference creation means provided at the tank wall of the agitation tank, and the temperature of the spouted liquid or slurry becomes higher or lower than the temperature of the surrounding liquid or slurry.

If the apparatus of the present invention is used to perform cooling crystallization, the temperature of the spouted liquid or slurry is made higher than the surrounding temperature with a heating means. As a portion of this liquid or slurry, which includes fine crystals due to the cooling process, is heated and the fine crystals are dissolved when returning along the tank wall to the mother liquor, all the heat transfer area of the lower portion can always be used due to the spouting, so that the cooling rate can be raised. As a result, the induction period for crystallization is shortened, and crystals with narrow size distribution and large size are grown.

Furthermore, if the apparatus of the present invention is used to perform concentration crystallization, the temperature of the spouted liquid or slurry is made lower than the surrounding temperature with a cooling means. This not only makes it possible to make the evaporation area and the heat transfer area in the concentration process larger, but when a portion of the liquid or slurry containing fine crystals is returned along the tank wall to the mother liquor, it is cooled, so that advantages obtained are that the crystallization rate of the crystals in the liquid can be increased, which shortens the induction period for crystallization, and crystals with narrow size distribution and large size can be grown. For example, when crystallizing glutamic acid with this apparatus, α-crystals are particularly abundant.

EXAMPLES

The following is an explanation of the present invention with reference to examples. However, it should be understood that the present invention is not limited to these examples.

Example 1: Cooling Crystallization

Using a crystallization apparatus having a heating means at an upper portion, a cooling means at a lower portion, and a liquid spouting device, the cooling crystallization of L-aspartic acid was carried out. 1.5 L of L-aspartic acid solution at a concentration of 0.53% by weight (wt %) was placed into a crystallization apparatus having 139.8 mm inner diameter and a capacity of 3 L provided with a liquid spouting device having pipes as the liquid feeding means, as shown in FIG. 1. The cooling was initiated at a rotation speed of 340 rpm. The temperature of the liquid in the apparatus was controlled to be 11.2° C. A jacket was provided at the portion where the spouted liquid or slurry hit the agitation tank, and warm water of 30° C. was circulated through the jacket. The temperature of the liquid or slurry in the crystallization apparatus was maintained at 11.2° C. (that is, a crystallization temperature of 11.2° C.), and the temperature of the cooling jacket was maintained at 5° C.

As a comparative example, a crystallization apparatus with an agitation tank of similar shape but having only agitation blades and no liquid spouting device and no heating means was used (referred to as conventional apparatus A, in the following). The temperature of the liquid or slurry in the conventional apparatus A was maintained at 11.2° C.

Figure 4:
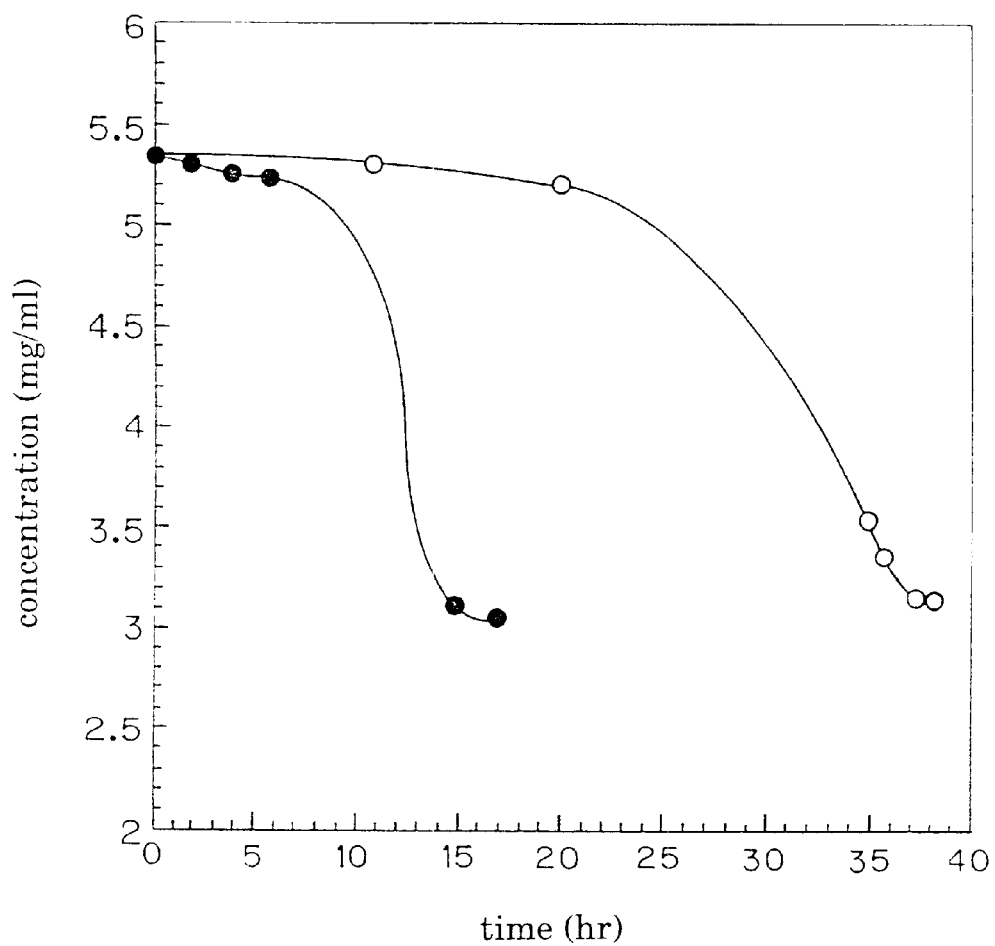
FIG. 4 is a graph illustrating the crystallization rate of L-aspartic acid using a crystallization apparatus of the present invention and using a conventional apparatus.

The results are shown in FIG. 4. The closed circles (●) in FIG. 4 illustrate the temporal change (crystallization rate) of the concentration of L-aspartic acid when the concentration was carried out with the crystallization apparatus of the present invention, and the open circles (○) when the concentration was carried out with the conventional apparatus A.

As becomes apparent from FIG. 4, when using the crystallization apparatus of the present invention, crystallization begins at about 6 hours after initiating the cooling, and this crystallization proceeds rapidly, and only about 17 hours were needed until the concentration of the L-aspartic acid decreased to about 3 mg/ml. On the other hand, using the conventional apparatus A, the crystallization began after about 20 hours, and about 38 hours were needed until the concentration of the L-aspartic acid decreased to about 3 mg/ml. Thus, it was appreciated that the induction time for crystal generation was shortened considerably by using the apparatus of the present invention.

Figure 5:
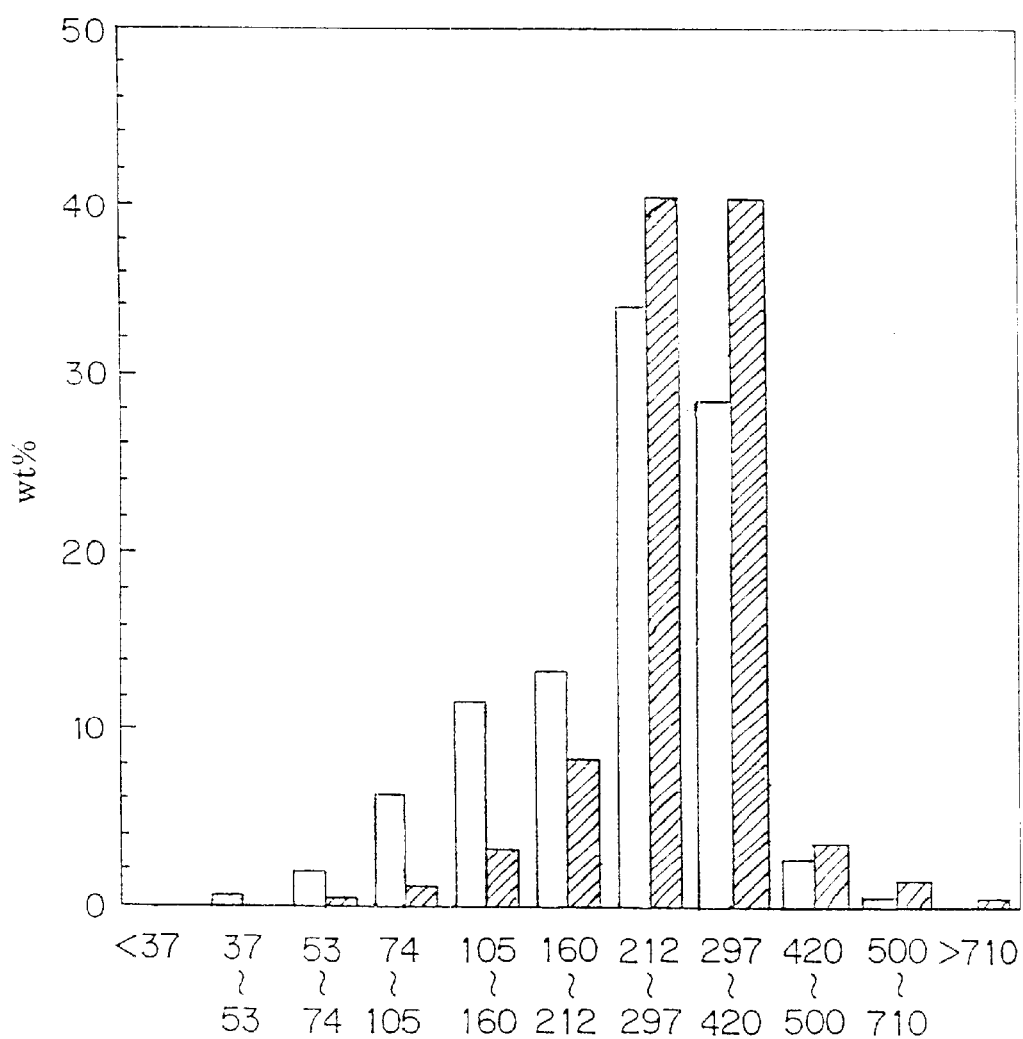
FIG. 5 is a graph illustrating the size distribution of the crystals of L-aspartic acid obtained with the crystallization apparatus of the present invention and with the conventional crystallization apparatus.

The results obtained by evaluating the size of the resulting crystal are shown in Table 1 and FIG. 5. FIG. 5 is a graph showing the distributions of the size obtained with the apparatus of the present invention and the conventional apparatus, respectively. The hatched columns indicate the crystals obtained with the apparatus of the present invention, and the open columns indicate the crystals obtained with the conventional apparatus A.

TABLE 1

| Diameter distribution of crystals μm | Conventional apparatus | | Apparatus of the present invention | |
|---|---|---|---|---|
| | Amount of crystals (g) | (%) | Amount of crystals (g) | (%) |
| >710 | 0 | 0 | 0.02 | 0.6 |
| 500–710 | 0.02 | 0.6 | 0.05 | 1.5 |
| 420–500 | 0.09 | 2.7 | 0.12 | 3.6 |
| 297–420 | 0.94 | 28.5 | 1.31 | 40.3 |
| 212–297 | 1.09 | 33.9 | 1.32 | 40.6 |
| 160–212 | 0.43 | 13.5 | 0.27 | 8.3 |
| 105–160 | 0.38 | 11.8 | 0.11 | 3.3 |
| 74–105 | 0.2 | 6.3 | 0.04 | 1.2 |
| 53–74 | 0.06 | 1.9 | 0.01 | 0.3 |

TABLE 1-continued

| Diameter distribution of crystals μm | Conventional apparatus | | Apparatus of the present invention | |
|---|---|---|---|---|
| | Amount of crystals (g) | (%) | Amount of crystals (g) | (%) |
| 37–53 | 0.02 | 0.6 | 0 | 0 |
| <37 | 0 | 0 | 0 | 0 |
| total | 3.23 | 99.8 | 3.25 | 99.7 |

These results show that the crystals of the L-aspartic acid obtained with the apparatus of the present invention have a larger size and a narrower size distribution than the crystals obtained with the conventional apparatus. It seems to be due to that a heating means is provided at the upper portion of the apparatus and the solution is contacted with this heating means, so that the generated fine crystals are dissolved again, and grow into crystals having larger size. That is to say, when using the apparatus of the present invention, the temperature of the solution is 11.2° C., but since the solution is heated, cooling water of 5° C. is circulated through a cooling jacket, a boundary film with a steep gradient develops between the cooling tank wall and the solution, and the saturation degree in the boundary film with steep gradient increases at between 5.6° C. and 11.2° C., which seems to accelerate the nucleation.

In this example, crystals of aspartic acid having large size could be obtained fast, in spite of no addition of seed crystals. It can be expected that when seed crystals are added, crystals of aspartic acid having even larger size can be obtained even faster.

Example 2: Concentration Crystallization

Using a crystallization apparatus having a cooling means at an upper portion, a heating means at a lower portion, and a liquid spouting device, the concentration crystallization of L-glutamic acid was carried out. Here, 2 liters of L-glutamic acid solution at a concentration of 50 g/L were placed into a crystallization apparatus having 139.8 mm inner diameter and a capacity of 3 L provided with a liquid spouting device having pipes as the liquid feeding means, as shown in FIG. 1. The cooling was initiated at a rotation speed of 290 rpm. The temperature of the liquid or slurry in the crystallization apparatus was controlled to be 29.8° C. (that is, at a crystallization temperature of 29.8° C.). In the apparatus of the present invention, a jacket was provided at the portion where the spouted liquid or slurry hit the agitation tank, and cooling water of 16° C. was circulated through the jacket. The temperature of the liquid or slurry in the crystallization apparatus was maintained at 29.8 ° C., and the temperature of the warming jacket was 36.5° C.

As a comparative example, a crystallization apparatus with a tank of similar shape but having only agitation blades and no liquid spouting device and no cooling means was used (conventional apparatus B). The temperature of the liquid (crystallization temperature) in the conventional apparatus B was maintained at 29.8° C.

Figure 6:
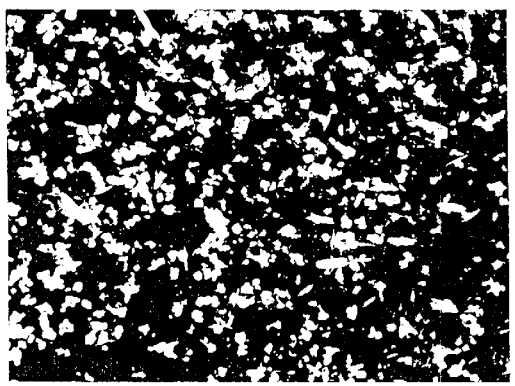
FIG. 6 shows photographs showing crystal forms existed as the crystallization proceeds.
Figure 6:
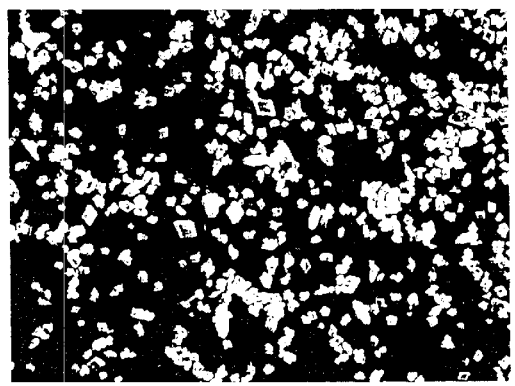
Figure 6:
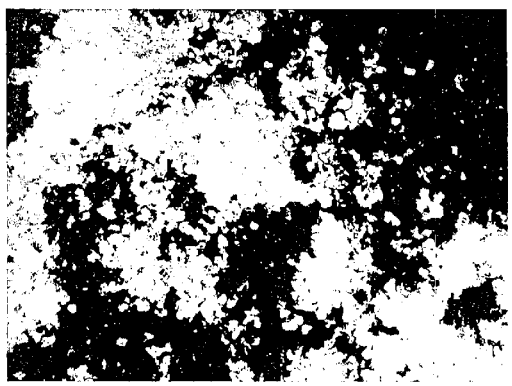
Figure 6:
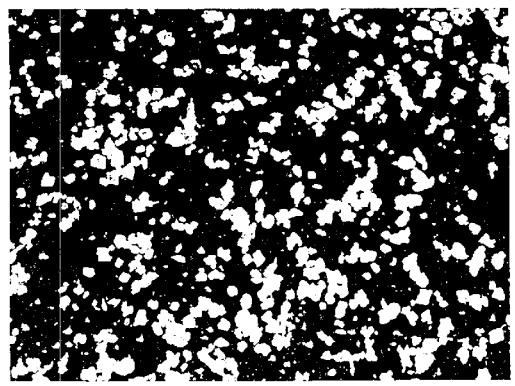
Figure 6:
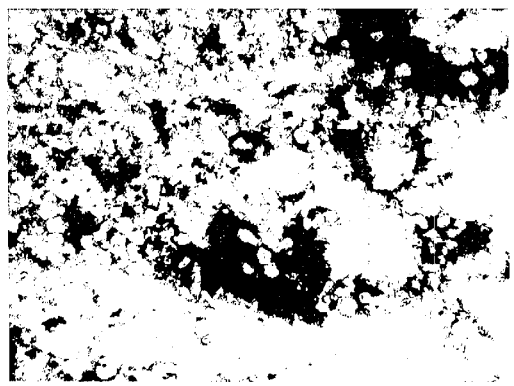
Figure 6:
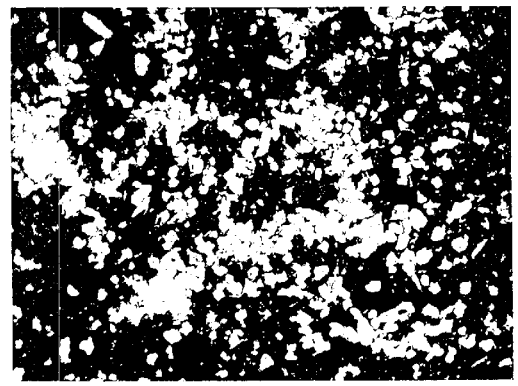

FIG. 6 shows a comparison of the crystal form in the solution when using the crystallization apparatus of the present invention and the crystal form in the solution when using the conventional crystallization apparatus B. FIGS. 6(A) P.8h, 6(C) P.12h, and 6(E) P.16h are photographs showing the crystal form after 8, 12 and 16 hours when using the conventional apparatus B, respectively. FIGS. 6(B)

P.W.W.8h, 6(D) P.W.W.12h, and 6(F) P.W.W.16h are photographs showing the crystal form after 8, 12 and 16 hours when using the crystallization apparatus of the present invention, respectively.

As becomes apparent from FIG. 6, when performing the crystallization with the conventional apparatus, after 8 hours 6(A), large sized α-crystals and small sized β-crystals are present as a mixture, and after 16 hours 6(E), almost all have turned into β-crystals.

On the other hand, looking at the situation after 8 hours 6(B) and 12 hours 6(D) using the apparatus of the present invention, only α-crystals were observed after eight hours 6(B), and very little β-crystals were observed after 12 hours 6(D). Also after 16 hours 6(F), the amount of β-crystals was small. This suggests that it is possible to obtain only α-crystals by using the crystallization apparatus of the present invention.

Figure 7:
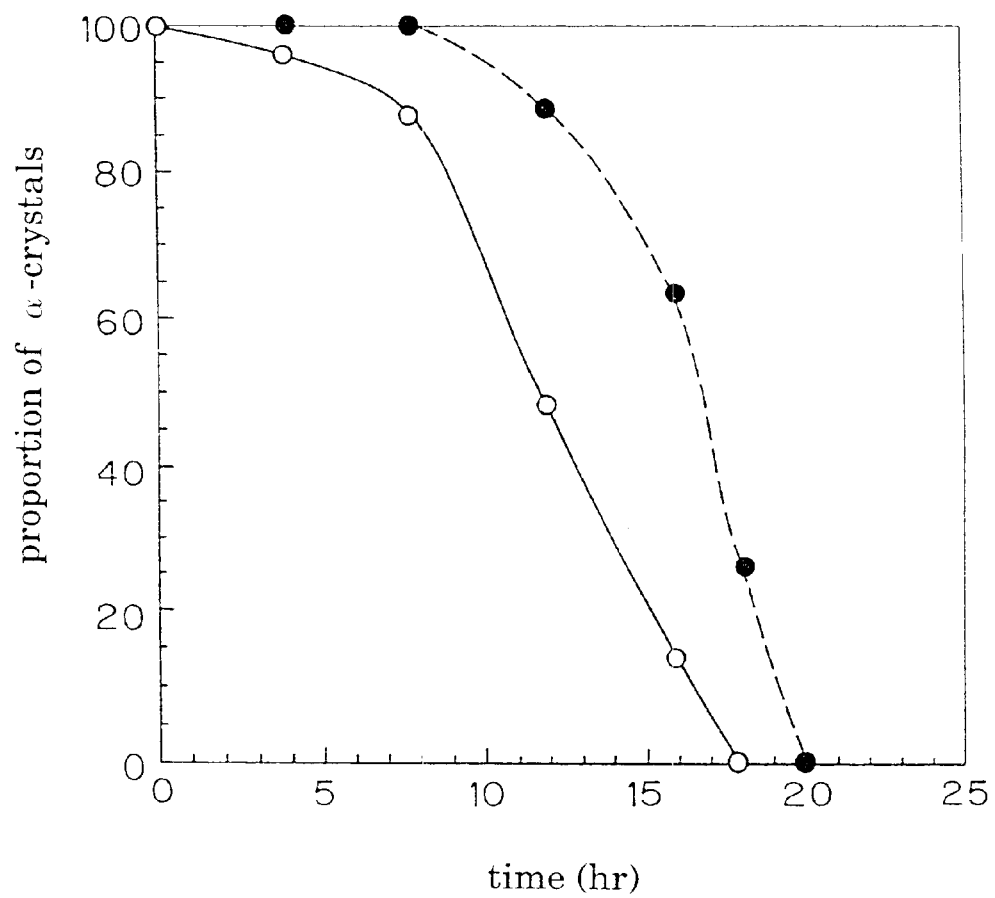
FIG. 7 is a graph illustrating the temporal change of the crystal form.

FIG. 7 illustrates the temporal change of the crystal form of L-glutamic acid in the crystallization. The closed circles (●) in FIG. 7 illustrate the change of the crystal form when the concentration was carried out with the crystallization apparatus of the present invention, and the open circles (○) when the concentration was carried out with the conventional apparatus. The proportion of α-crystals was determined with powder X-ray diffraction. It can be seen from FIG. 7, that only α-crystals are present for up to ten hours by using the crystallization apparatus of the present invention.

These results show that it is possible to obtain only the desired crystal form (that is, α-crystals in the case of L-glutamic acid) by using the crystallization apparatus of the present invention.

Figure 8:
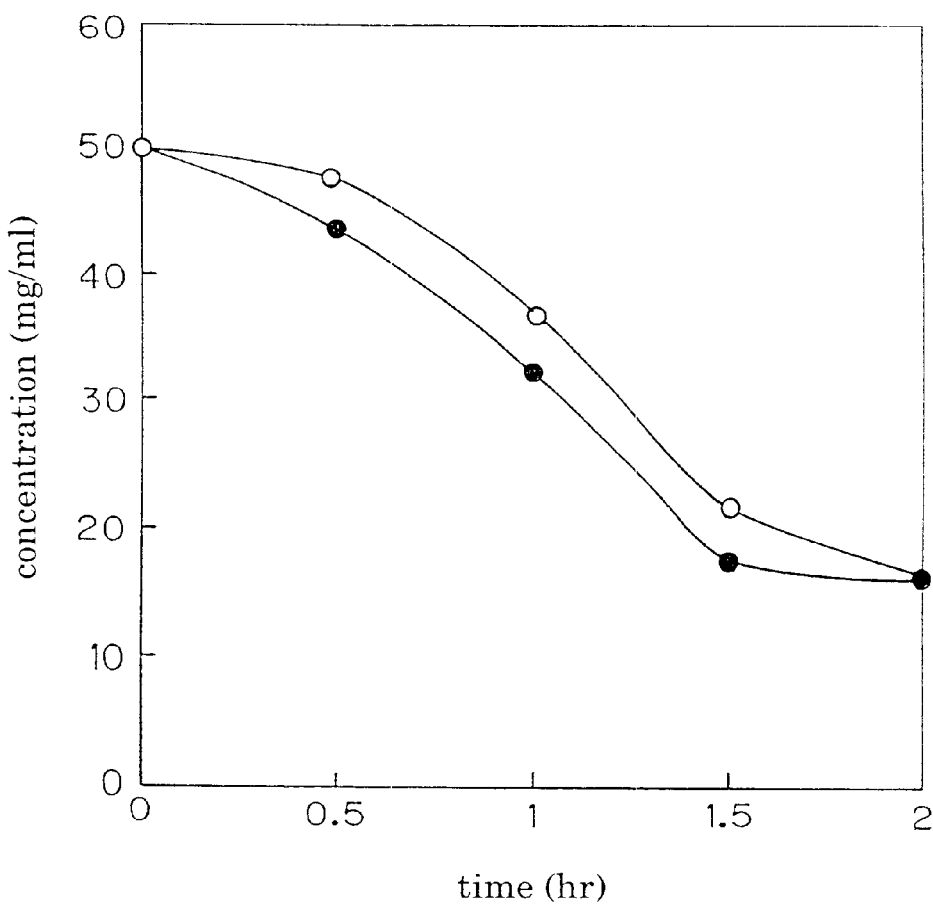
FIG. 8 is a graph illustrating the temporal change of the concentration of L-glutamic acid.

Furthermore, FIG. 8 illustrates the temporal change of the concentration of L-glutamic acid (crystallization rate). The closed circles (●) illustrate the case when the concentration was carried out with the crystallization apparatus of the present invention, and the open circles (○) when the concentration was carried out with the conventional apparatus. The solubility of α-crystals (16 mg/L) was reached somewhat faster by using the apparatus of the present invention. That is to say, it seems that, when using the apparatus of the present invention, the concentration of the solution decreases faster, so that the secondary nucleation is suppressed, and only α-crystals are generated. In addition, since the apparatus of the present invention is provided with a cooling means, a portion of the solution is cooled. Therefore, the saturation degree is raised, the nucleation of α-crystals in this portion is accelerated, and the crystals grow fast. It seems to be a reason for the fast crystallization.

Figure 9:
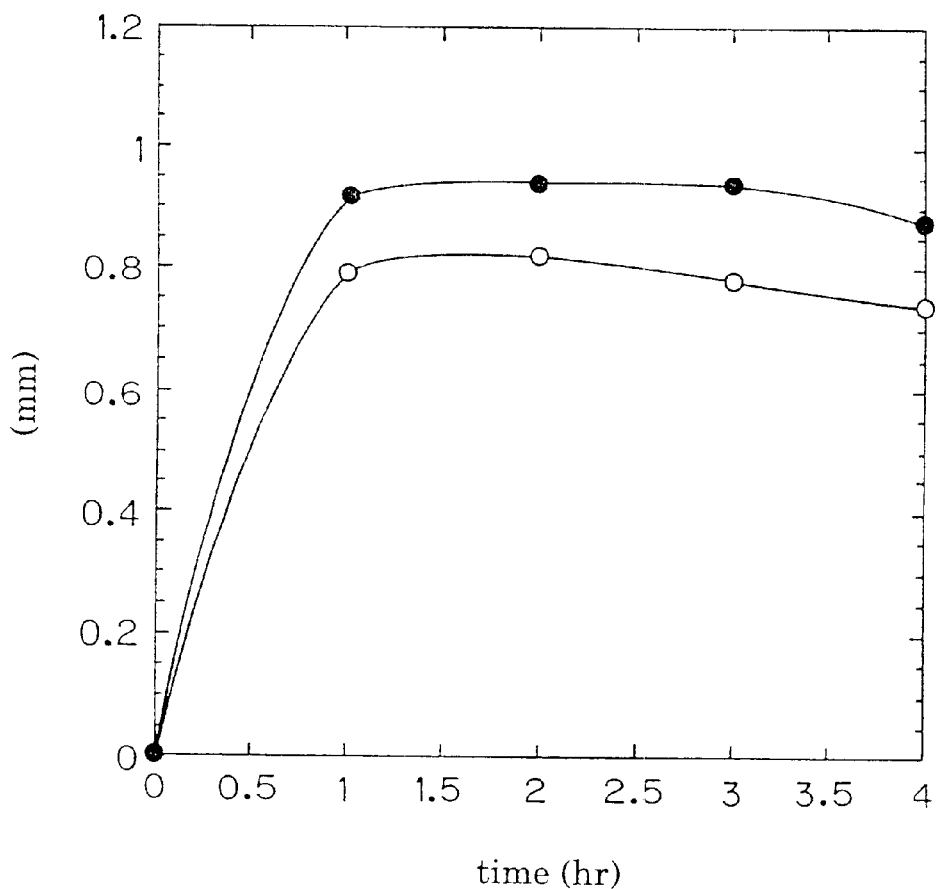
FIG. 9 is a graph illustrating the temporal change of the average diameter of crystals of L-glutamic acid.

FIG. 9 illustrates the average crystal diameter of the crystals of L-glutamic acid. The closed circles (●) illustrate the case when the crystallization apparatus of the present invention was used, and the open circles (○) when the concentration was carried out with the conventional apparatus. It could be shown that the average crystal diameter become larger when using the crystallization apparatus of the present invention.

Figure 10:
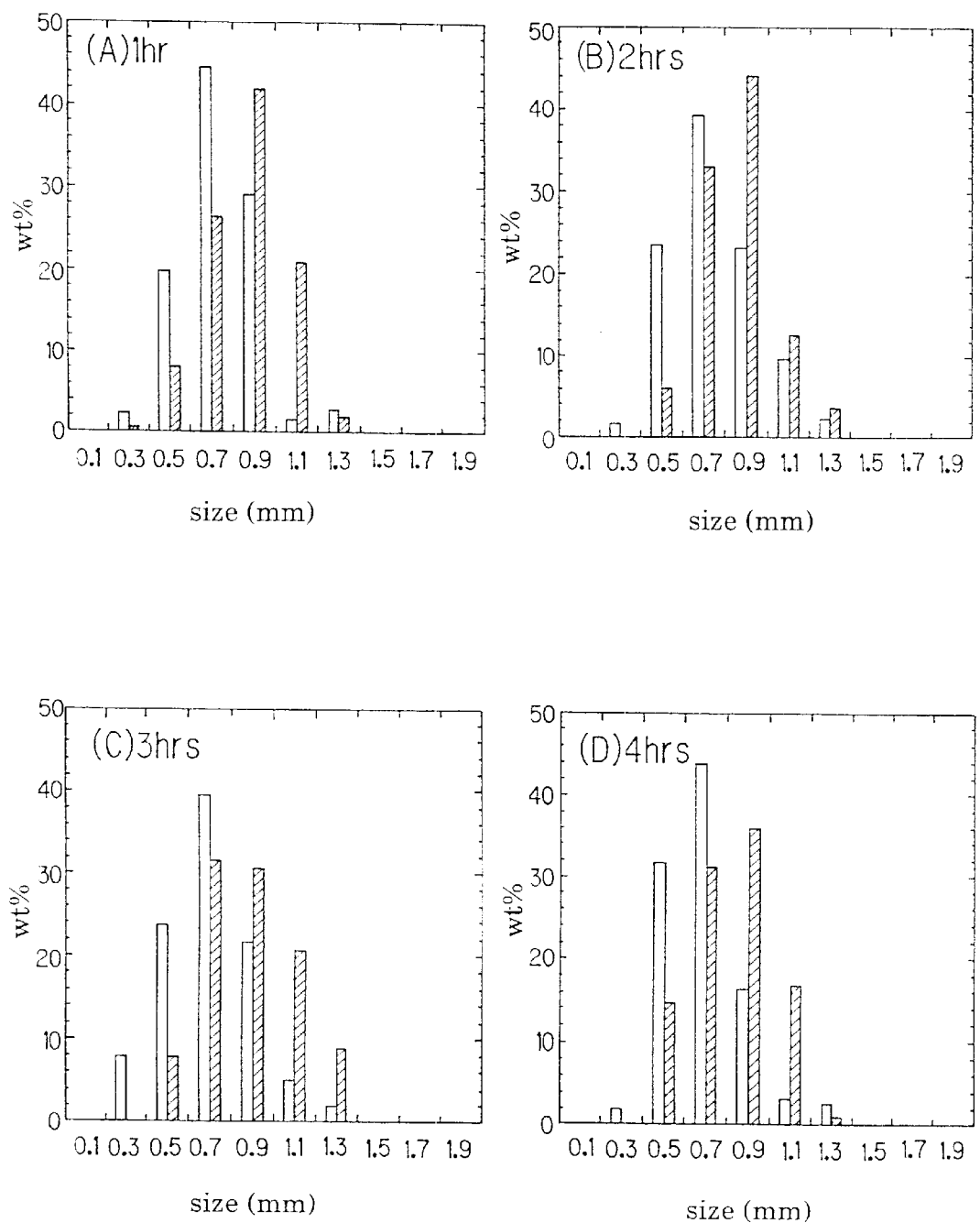
FIG. 10 shows graphs illustrating the average diameter distribution of crystals of L-glutamic acid at various times during the concentration.

Furthermore, FIG. 10 illustrates the average crystal diameter distribution of the crystals of L-glutamic acid over time. It could be shown that the average crystal diameter of the crystals of L-glutamic acid was always larger when using the crystallization apparatus of the present invention (hatched columns in FIG. 10).

These results show that by a concentration crystallization, in which a cooling means is provided at the upper portion, the α-crystal nucleation is accelerated and the β-crystal nucleation is suppressed, that is, crystal polymorphism can be controlled. Moreover, the results show that crystals can be grown faster and have larger size by using the crystallization apparatus of the present invention.

It seems that one reason for the fact that it is possible to suppress the transition from α-crystals to β-crystals of L-glutamic acid and to control crystal polymorphism is that the crystals dissolve less easily due to the large crystal size.

Example 3

The crystallization of terephthalic acid was performed with the apparatus of FIG. 2. 40 liters of ethylene glycol at 16 volume % by weight (W/V %) were placed into an agitation tank having a capacity of 100 liters and 400 mm internal diameter, to which the liquid spouting device shown in FIG. 2 was attached. The initial temperature (at zero hours) of the upper temperature difference creation means H (upper jacket) was 100° C., and the temperature of the lower temperature difference creation means J (lower jacket) was 74° C. The temperature of the upper jacket was maintained at 74° C. for four hours, and the temperature of the lower jacket was gradually lowered. These temperature conditions are shown in Table 2.

TABLE 2

| Time (hours) | Body temperature (° C.) | Temperature of lower jacket (° C.) | Temperature of upper jacket (° C.) |
| --- | --- | --- | --- |
| 0 | 84.2 | 74.2 | 100 |
| 1 | 54.3 | 31.4 | 100 |
| 2 | 45.8 | 19.4 | 100 |
| 3 | 45.2 | 14.3 | 100 |
| 4 | 44.8 | 3.8 | 100 |
| 5 | 21.0 | 2.5 | 51.1 |
| 6 | 10.9 | 6.5 | 26.7 |

For comparison, a crystallization apparatus with a tank of similar shape but having only agitation blades and no liquid spouting device and no heating means was used (conventional apparatus C). In this case, cooling was performed so that the temperature of the ethyleneglycol (body temperature) was the same temperature as shown in Table 2.

Figure 11:
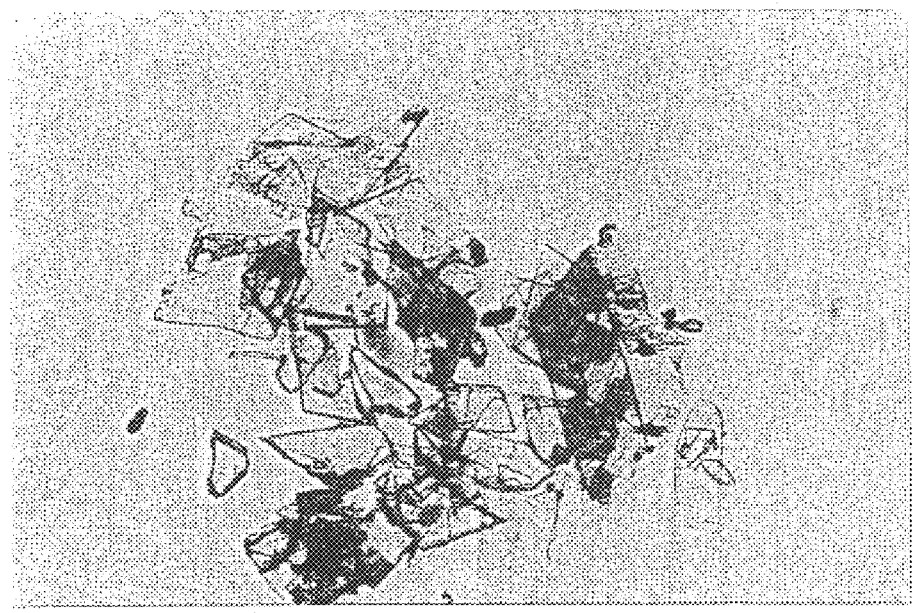
FIG. 11 shows photographs showing crystals of terephthalic acid.
Figure 11:
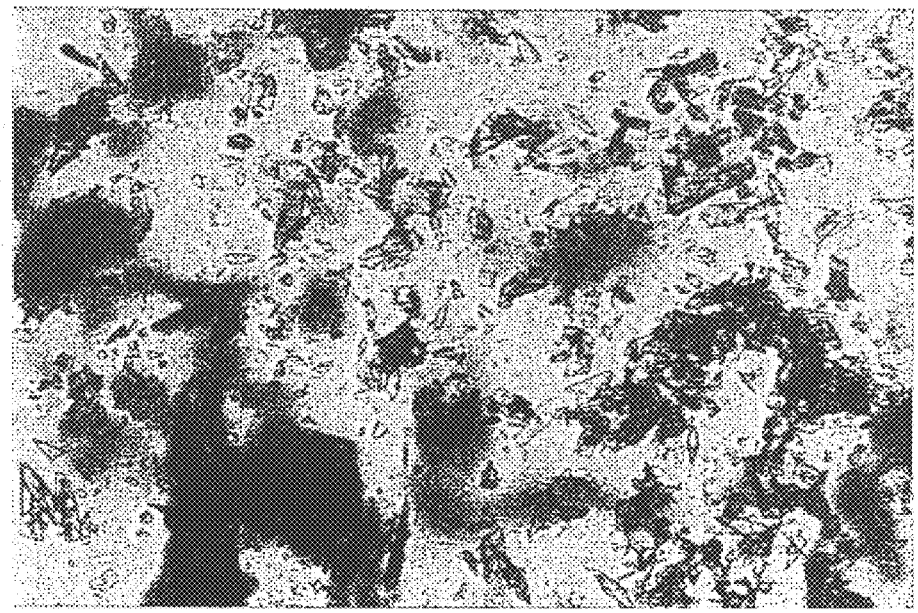

Using the crystallization apparatus of the present invention, crystal precipitation had begun after three hours. After six hours, 1 liter each was taken for sampling from the crystallization apparatus of the present invention and from the conventional apparatus C, respectively. After these samples were allowed to stand for two hours, the precipitations were observed that the bulk density was about 40% (that is, solid portions accounted for the lower 40%) in the case of the apparatus of the present invention. On the other hand, the bulk density was about 80% (that is, solid portions accounted for the lower 80%) in the case of the conventional apparatus C. This shows that the crystals obtained with the conventional apparatus C were smaller. The above result was corroborated by observation under the microscope that the crystals of terephthalic acid obtained with the apparatus of the present invention were larger than the crystals of terephthalic acid obtained with the conventional apparatus C (see FIGS. 11A–11B).

INDUSTRIAL APPLICABILITY

The crystallization apparatus of the present invention has a liquid spouting device and a temperature difference creation means, so that a high crystallization rate can be attained by controlling the temperature of the temperature difference creation means. Consequently, large crystals can be grown fast. Furthermore, it is also possible to control polymorphism, that is, to obtain crystals with the desired structure from various crystal structures. Also, the apparatus of the present invention can be used as both a cooling crystallization apparatus and a concentration crystallization apparatus, and it is possible to control the crystal form and to grow large crystals.

What is claimed is:

1. A crystallization apparatus, comprising:
   an agitation tank;
   a liquid circulation means for circulating a liquid or a slurry along a wall of the agitation tank; and
   one or more temperature difference creation means capable of creating a temperature difference at the wall of the agitation tank,
   wherein the temperature difference creation means is installed to the agitation tank.

2. A crystallization apparatus, comprising:
   an agitation tank provided with a liquid spouting device made of a rotation shaft and one or more liquid feeding means mounted to the rotation shaft; and
   one or more temperature difference creation means capable of creating a temperature difference at a wall of the agitation tank.

3. The crystallization apparatus of claim 2, wherein the temperature difference creation means is one or more heating means or cooling means.

4. The crystallization apparatus of claim 3, wherein the temperature difference creation means is a heating means, which is provided at a region where where liquid or slurry spouted by rotating the liquid spouting device contacts the wall of the agitation tank or a region below that region, and which increases the temperature of the spouted liquid or slurry above the temperature of surrounding liquid or slurry.

5. The crystallization apparatus of claim 3, wherein the temperature difference creation means is a cooling means, which is provided at a region where where liquid or slurry spouted by rotating the liquid spouting device contacts the wall of the agitation tank or a region below that region, and which decreases the temperature of the spouted liquid or slurry below the temperature of surrounding liquid or slurry.

6. The crystallization apparatus of claim 3,
   wherein the temperature difference creation means includes two cooling means and one heating means;
   wherein the heating means is arranged below the two cooling means; and
   wherein a liquid or slurry is spouted against a portion between the two cooling means or against a portion of the lower cooling means by rotating the liquid spouting device.

7. The crystallization apparatus of claims 3, wherein the liquid feeding means is a gutter-shaped body, a pipe body, a plate-shaped body, or a conically shaped hollow truncated corn body.

8. The crystallization apparatus of any of claims 3, wherein the crystallization apparatus is a cooling crystallization apparatus.

9. The crystallization apparatus of claim 2, wherein the the temperature difference creation means is a heating means, which is provided at a region where liquid or slurry spouted by rotating the liquid spouting device contacts the wall of the agitation tank or a region below that region, and which increases the temperature of the spouted liquid or slurry above the temperature of surrounding liquid or slurry.

10. The crystallization apparatus of claim 9, wherein the liquid feeding means is a gutter-shaped body, a pipe body, a plate-shaped body, or a conically shaped hollow truncated corn body.

11. The crystallization apparatus of claim 9, wherein the crystallization apparatus is a cooling crystallization apparatus.

12. The crystallization apparatus of claim 2, wherein the temperature difference creation means is a cooling means, which is provided at a region where liquid or slurry spouted by rotating the liqud spouting device contacts the wall of the agitation tank or a region below that region, and which decreases the temperature of the spouted liquid or slurry below the temperature of surrounding liquid or slurry.

13. The crystallization apparatus of claim 12, wherein the liquid feeding means is a gutter-shaped body, a pipe body, a plate-shaped body, or a conically shaped hollow truncated corn body.

14. The crystallization apparatus of claim 12, wherein the crystallization apparatus is a concentration apparatus.

15. The crystallization apparatus of claim 2,
   wherein the temperature difference creation means includes two cooling means and one heating means;
   wherein the heating means is arranged below the two cooling means; and
   wherein a liquid or slurry is spouted against a portion between the two cooling means or against a portion of the lower cooling means by rotating the liquid spouting device.

16. The crystallization apparatus of claim 15, wherein the liquid feeding means is a gutter-shaped body, a pipe body, a plate-shaped body, or a conically shaped hollow truncated corn body.

17. The crystallization apparatus of claim 15, wherein the crystallization apparatus is a concentration crystallization apparatus.

18. The crystallization apparatus of claim 2, wherein the liquid feeding means is a gutter-shaped body, a pipe body, a plate-shaped body, or a conically shaped hollow truncated corn body.

19. The crystallization apparatus of claim 18, wherein the crystllization apparatus is a cooling crystallization apparatus.

20. The crystallization apparatus of claim 18, wherein the crystallization apparatus is a concentration crystallization apparatus.

21. The crystallization apparatus of claim 2, wherein the crystallization apparatus is a cooling crystallization apparatus.

22. The crystallization apparatus of claim 2, wherein the crystallization apparatus is a concentration crystallization apparatus.

* * * * *